No. 630,162. Patented Aug. 1, 1899.
S. R. BAILEY.
CARRIAGE SPRING.
(Application filed Dec. 29, 1898.)
(No Model.)
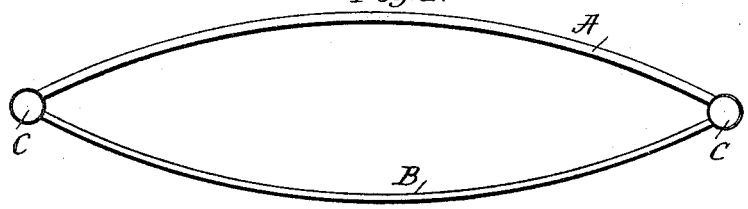
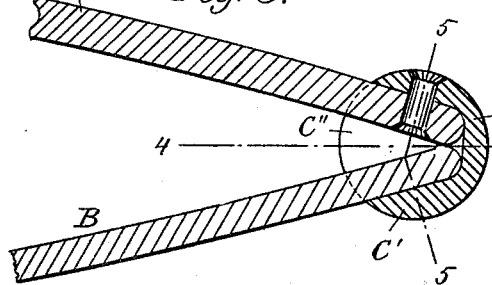
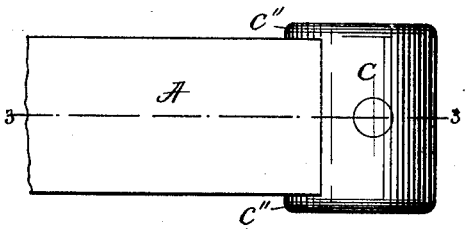
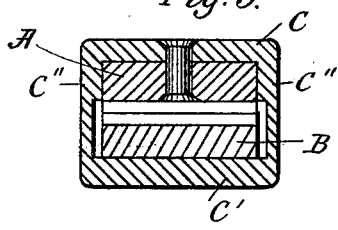
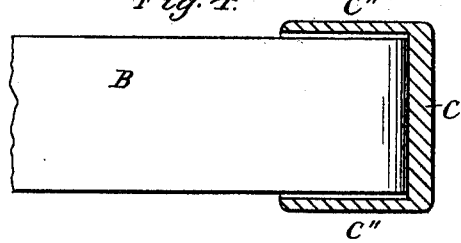
Witnesses—
Karl A. Andrén.
William W. Lummus.
Inventor—
Samuel R. Bailey.
by Albau Andrén
his atty.

UNITED STATES PATENT OFFICE.

SAMUEL R. BAILEY, OF AMESBURY, MASSACHUSETTS.

CARRIAGE-SPRING.

SPECIFICATION forming part of Letters Patent No. 630,162, dated August 1, 1899.

Application filed December 29, 1898. Serial No. 700,671. (No model.)

*To all whom it may concern:*

Be it known that I, SAMUEL R. BAILEY, a citizen of the United States, residing at Amesbury, in the county of Essex and State of Massachusetts, have invented new and useful Improvements in Carriage-Springs, of which the following is a specification.

This invention relates to improvements on the patent granted to me December 28, 1897, No. 596,313, for carriage-springs, in which the ends of the preferably upper elliptic spring are provided with sockets, in which the ends of the lower or loose elliptic spring are retained; and it has for its object to prevent the rattling of such lower or loose elliptic spring in its retaining-sockets, caused by the undue compression of the lower or free spring relative to the socketed spring, as will hereinafter be more fully shown and described, reference being had to the accompanying drawings, wherein—

Figure 1 represents a side elevation of the invention. Fig. 2 represents an enlarged top plan view of one end of the spring. Fig. 3 represents a longitudinal section on the line 3 3 shown in Fig. 2. Fig. 4 represents a horizontal section on the line 4 4 shown in Fig. 3, and Fig. 5 represents a cross-section on the line 5 5 shown in Fig. 3.

Similar letters refer to similar parts wherever they occur on the different parts of the drawings.

In the drawings, A and B represent, respectively, the upper and lower leaves of an elliptic vehicle-spring, as usual. To the ends of the upper spring A are secured or made integral therewith the sockets C, each one having on its under side a lip C′, which serves to hold the ends of the upper and lower springs together and prevent their getting apart by the jolting of the carriage or otherwise. In practice each of said sockets C is preferably provided with closed end pieces C″ C″, which serve as abutments to prevent a lateral motion of the free spring B relative to the fixed or socketed spring A in a manner as shown and described in my aforesaid patent.

For the purpose of preventing the undue rattling of the lower or free spring B relative to the upper or socketed spring A, I construct each member of a single piece of spring metal and make the integral body of the upper member of greater thickness, uniformly from end to end, than the integral body of the lower member, so that during the compression of the springs the free spring being the weaker and more elastic will yield more readily than the more rigid socketed spring, and consequently cause its ends to be expanded and held in contact with the interior portions of the sockets attached to or made integral with the other spring, by which the rattling of the free spring is obviated.

In the drawings I have shown the socketed spring A as being the upper one and the free spring B as the lower one; but although this arrangement is preferred it is not essential, as I may, if so desired, arrange the free and weaker spring B above the stronger socketed spring A without departing from the essence of my invention.

I am aware that one half of an elliptic spring has heretofore been made stiffer than the other half by employing a greater number of superimposed plates in the one half than in the other; but such is not my invention and is not claimed by me.

What I wish to secure by Letters Patent and claim is—

An elliptic spring comprising two similar arched members, each formed of a single piece of spring metal, and one having its integral body of greater thickness, uniformly from end to end, than the integral body of the other, and sockets secured to the ends of the member of greatest thickness and in which the ends of the member of least thickness are longitudinally slidable, substantially as and for the purposes described.

In testimony whereof I have hereunto set my hand in presence of two subscribing witnesses.

SAMUEL R. BAILEY.

Witnesses:
ALBAN ANDRÉN,
KARL A. ANDRÉN.